Figure 1:
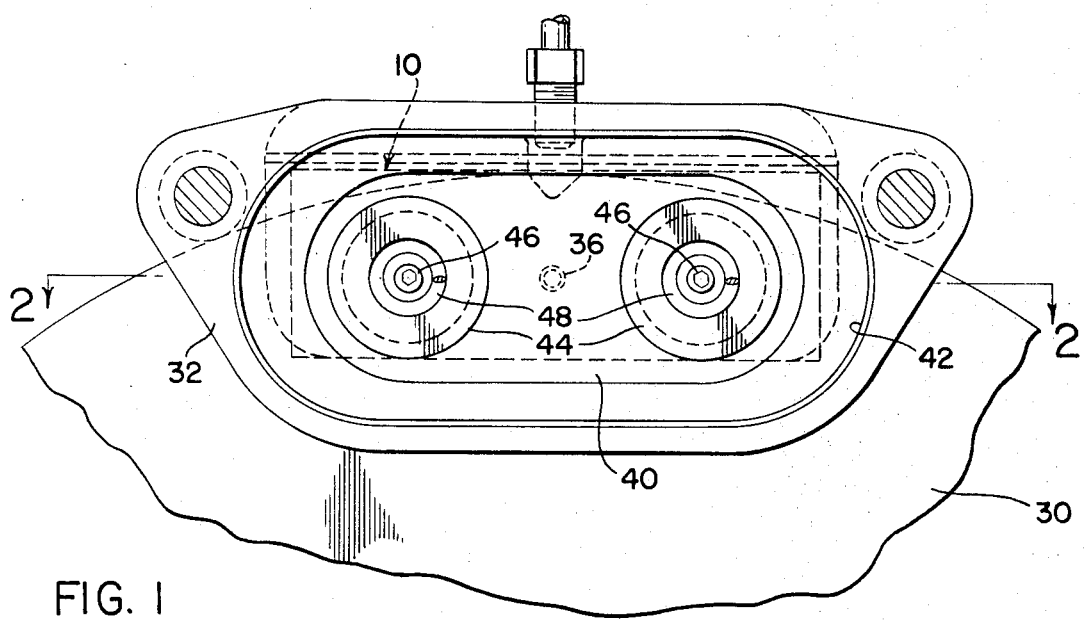

United States Patent

[11] 3,543,900

| [72] | Inventors | William H. Colbert;<br>Derald H. Kraft, Canton, Ohio |
|---|---|---|
| [21] | Appl. No. | 740,266 |
| [22] | Filed | June 26, 1968 |
| [45] | Patented | Dec. 1, 1970 |
| [73] | Assignee | Gulf & Western Industrial Products Company<br>Grand Rapids, Michigan<br>a corporation of Delaware. by mesne assignments |

[54] FRICTION PLATES FOR CLUTCHES AND BRAKES
2 Claims, 5 Drawing Figs.

[52] U.S. Cl....................................................... 192/107;
188/251, 188/73
[51] Int. Cl........................................................ F16d 13/60
[50] Field of Search........................................... 192/107,
107(T); 188/218(Axial), 250(A-7), 251, 236,
242, 245, 250(B)

[56] References Cited
UNITED STATES PATENTS

| 1,903,723 | 4/1933 | Palmer.......................... | 188/250A7 |
|---|---|---|---|
| 2,311,113 | 2/1943 | Klocke.......................... | 192/107T |
| 2,943,713 | 7/1960 | Salak et al. .................... | 188/251 |
| 3,366,200 | 1/1968 | Hayes............................ | 188/250BX |
| 3,370,679 | 2/1968 | Holmes......................... | 188/73 |
| 3,386,534 | 6/1968 | Press............................. | 188/73 |
| 3,422,935 | 1/1969 | House........................... | 188/73 |

*Primary Examiner*—Benjamin W. Wyche III
*Attorney*—Meyer, Tilberry and Body

ABSTRACT: A friction plate assembly formed from a flat sheet with the edges of the sheet being disposed generally transverse to the plane of the sheet. A rigid backing plate is frictionally gripped by the edges of the sheet to retain the sheet assembled to the plate.

Patented Dec. 1, 1970 3,543,900

INVENTORS.
DERALD H. KRAFT &
WILLIAM H. COLBERT
BY
Meyer, Tilberry & Body
ATTORNEYS

3,543,900

FRICTION PLATES FOR CLUTCHES AND BRAKES

DISCLOSURE

This invention relates to clutches and brakes and, more particularly, to a friction plate construction particularly adapted for spot type or caliper type clutches or brakes.

Friction plates traditionally have taken either one or two forms. One such prior art form comprises friction material secured to a relatively rigid backing plate, either by bonding or by the use of fasteners, with the backing plate then being supported on some form of mounting support. With this type of construction, a relatively heavy backing plate is required and this renders the bonding process difficult to perform. Moreover, the heavy backing plate materially adds to the cost of the assembly. If the friction material is not bonded to the backing plate, some form of a fastener is required and these fasteners frequently tend to loosen thereby permitting the friction material to separate from the backing plate. Moreover, the fasteners must be strategically located so as not to interfere with the operation of the clutch or brake.

Another approach that has been employed is to assemble the friction material on a thin plate or sheet which in turn is secured to a rigid backing plate by the use of appropriate fasteners. Various types of fasteners and means have been devised to secure the sheet or plate to the backing plate; however, these various fasteners have substantially increased both the complexity and the cost of the assembly.

It is a primary object of this invention to provide a friction plate which is simple in construction, economical to produce and which may be readily assembled and disassembled to a backing plate.

In accordance with the principal aspect of this invention, there is provided a friction plate assembly comprising a plate or sheet of relatively thin gage metal on which a plurality of friction pads are bonded. The edges of the sheet are bent over at right angles to the plane of the plate and thereby define a rectangular cup or shallow pan on the back surface of the sheet. This friction plate assembly is then received over a rectangular backing plate with the inturned edges of the sheet gripping the sides of the backing plate to retain the friction plate to the backing plate.

Other features and objects of this invention become more apparent upon a complete reading of the following description which, together with the attached drawings, describes but one preferred embodiment of the invention.

Figure 2:
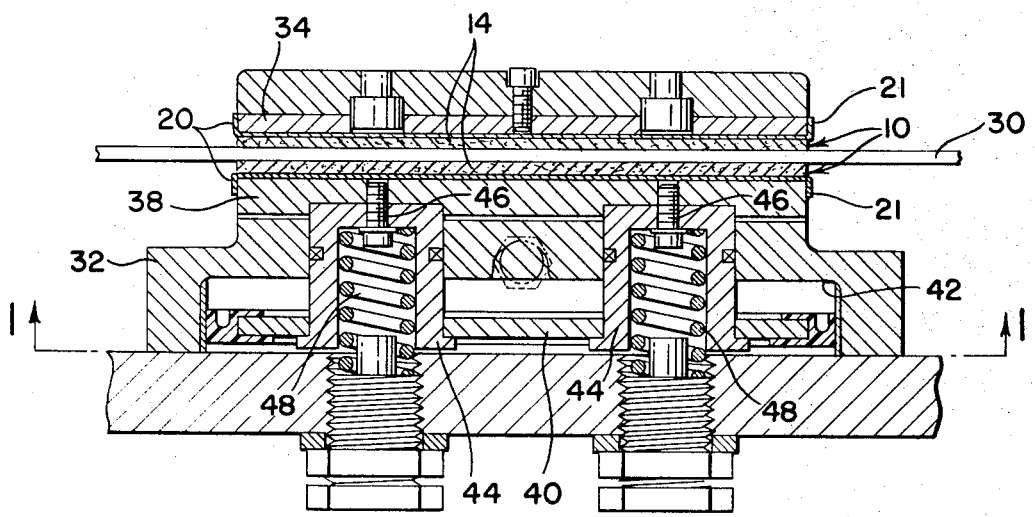
Figure 3:
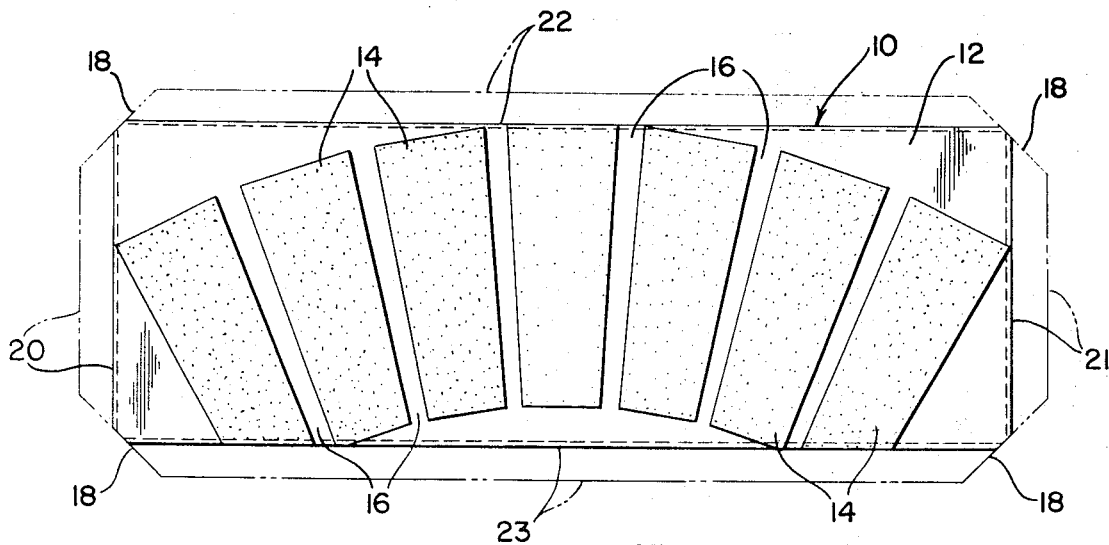
Figure 4:
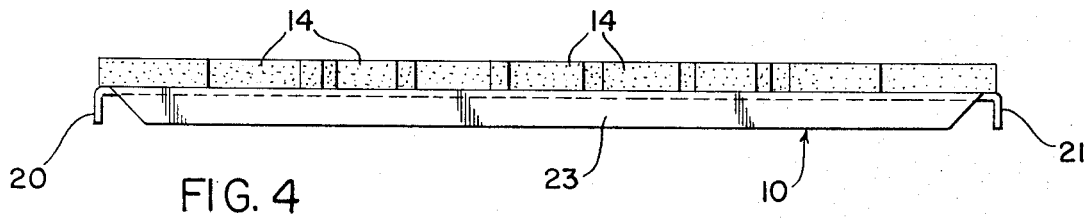
Figure 5:
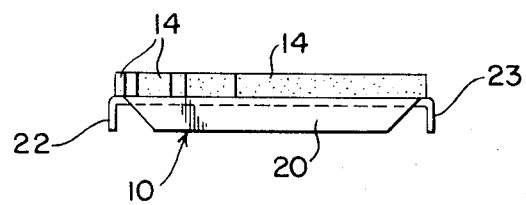

Referring now to the drawings wherein like reference numerals indicate like parts in the various views; before the edges are bent over, FIG. 1 is a fragmentary front elevation view of a spot type disk brake incorporating the principles of this invention, FIG. 2 is a sectional view along 2–2 of FIG. 1, FIG. 3 is a top planar view of a friction plate produced in accordance with this invention, FIG. 4 is a side elevation view of the friction plate of FIG. 3, FIG. 5 is an end elevation view of the friction plate of FIG. 3.

Referring now to the drawings wherein the showings are for purposes of illustrating a preferred embodiment only, there is illustrated in FIG. 3 a friction plate constructed in accordance with this invention. This friction plate, indicated generally by the reference numeral 10, comprises a relatively thin gage flat plate or sheet of metal 12. Bonded to the one face of the plate are a plurality of friction pads 14. As viewed in FIG. 3, it is apparent that these friction pads are arranged in a fan-shaped configuration with spaces between each adjacent friction pad thereby defining a plurality of radially extending grooves 16. The friction pads 14 are secured to the face of the plate 12 by conventional bonding techniques.

As shown in dotted lines in FIG. 3, each corner 18 of the plate is severed at approximately a 45° angle. Thereafter, the ends 20, 21 and sides 22, 23 of the plate are bent down generally at right angles to the plane of the plate 12, thereby forming a substantially pan-shaped or cup-shaped configuration on the under surface of the friction plate. The removal of the material at each corner 18 facilitates the bending of the edges and eliminates any tendency of the metal to buckle during the bending operation. The formed friction plate is illustrated in side view and end view in FIGS. 4 and 5 respectively.

The friction plate 10 is adapted to be employed in a brake or clutch of the general configuration illustrated in FIGS. 1 and 2. Thus, the clutch or brake is of the caliper or spot-type in which only a portion of the periphery of the rotating disk 30 is engaged by the friction pad. Referring more specifically to FIG. 2, the clutch or brake mechanism comprises a housing 32 which straddles the rotating disk 30. A friction plate 10 is disposed on opposite sides of the disk 30. One of the friction plates 10 is received over a rigid backing plate 34 which is secured by appropriate fasteners 36 to the housing 32. The other friction plate 10 is received over a rigid backing plate 38 with the backing plate 38 being movably supported on the housing 32.

The movement of the one backing plate 38 may be accomplished by the fluid actuator illustrated in FIG. 2 and which comprises a piston 40 received in a chamber 42. Piston rods 44 are secured by fasteners 46 to the backing plate 38 with the inner ends of the rods 44 being operatively engaged with the piston 40. Springs 48 normally bias the piston rods and backing plate 38 to a position where the friction plate 10 is in engagement with the rotating disk 30. Introduction of fluid pressure into the chamber 42 will, as is well understood in the art, cause the piston 40 to be displaced and retract both the piston rods 44 and the associated backing plate 38 against the bias of the springs 48 thereby disengaging the friction plate 10 from the disk 30.

It will be appreciated that other arrangements of elements for actuating the friction plates and backing plates may be employed. The important aspect of this invention resides in the construction of the friction plate and the relationship between the friction plate 10 and the backing plates 34, 38. These backing plates are substantially rectangular in configuration and are dimensioned to be received within the pan-shaped recess defined by the down turned edges of the sheet 12. As illustrated in FIG. 2, the down turned edges of the friction plate snugly engaged the side edges of the plates 34, 38 and in this manner frictionally retain the friction pads assembled to the face of each of the backing plates.

With the described arrangement, it will be appreciated that the friction plates require no special mounting other than the proper dimensioning of the backing plate and the down turned edges of the flat sheet 12. In this manner, relatively thin gage material may be employed for the friction plate thereby facilitating the bonding of the friction pad material to the flat sheet. Moreover, the friction plate may readily be installed by simply slipping the plate over the backing plate. The friction plate can be readily replaced by simply pulling the plate away from its backing.

The simple mounting of the friction plate on the backing plate is effective to retain the friction plate properly oriented for engagement with the face of the disk. In the event one edge of the friction plate tends to lift away from the backing plate or otherwise separate from the backing plate, the clamping engagement of the clutch or brake will quickly cause the friction plate to slide back over the backing plate and thereby reorient the plate for proper clamping action.

The radially segmented friction pads on the face of the plate help to reduce the temperature of the friction material through the circulation of air through the air gaps 16. Moreover, the segmented arrangement provides a scouring action on the face of the disk and thus prolongs the life of the friction material.

All of the foregoing advantages, as well as others, are achieved in an economical construction which requires a minimum of fabrication expenditure.

Modifications and alterations in the above-described embodiment will suggest themselves to those having ordinary skill in the art and it is intended that such modifications and alterations are to be included within the scope of this invention as defined by the appended claims.

We claim:

1. A friction plate assembly comprising: a generally flat and rectangular metal sheet having a thinness rendering it flexible and incapable of acting as a brake or clutch backup plate without additional support, said sheet having four edges, each of said edges having a flange disposed generally transverse to the plane of said sheet and extending continuously along substantially the entire extent of each of said edges thereby forming a receptacle at one side of said sheet, friction material secured to the other side of said sheet opposite from said flanges, a rectangular rigid backing plate having a thickness rendering it stiff and capable of acting as a brake or clutch backup plate without additional support, said sheet being positioned over said backing plate with said backing plate received in said receptacle and in engagement with said one side of said sheet and with said transverse flanges being resiliently urged into frictional gripping engagement with said edges of said backing plate whereby said sheet is removably secured to said backing plate only through the resilient frictional gripping engagement of said flanges with said plate.

2. The assembly of claim 1 wherein said friction material comprises a plurality of friction pads positioned in an arcuate path and in spaced-apart relationship to define radially extending air spaces between adjacent pads.